United States Patent [19]
Bücker et al.

[11] 3,792,788
[45] Feb. 19, 1974

[54] LOADING AND UNLOADING OF BRICKS AND OTHER ARTICLES ONTO, AND FROM, PALLETS

[75] Inventors: Franz Bücker; Dieter Keck, both of Laggenbeck, Germany

[73] Assignee: C. Keller u. Co., Laggenbeck, Germany

[22] Filed: Jan. 6, 1972

[21] Appl. No.: 215,768

[30] Foreign Application Priority Data
Jan. 8, 1971  Germany............................ 2100820

[52] U.S. Cl................ 214/152, 214/6 BA, 214/6 P, 214/6.5, 214/10.5 R
[51] Int. Cl........................ B65g 57/30, B65g 60/00
[58] Field of Search...........214/6 BA, 6 P, 6 A, 6 H, 214/10.5 R, 6.5

[56] References Cited
UNITED STATES PATENTS

| | | | |
|---|---|---|---|
| 3,363,781 | 1/1968 | Magnetti | 214/6 P |
| 3,181,712 | 5/1965 | Von Gal, Jr. | 214/6 BA |
| 3,682,338 | 8/1972 | Von Gal, Jr. et al. | 214/6 P |
| 3,323,662 | 6/1967 | Danielsson et al. | 214/6 BA X |
| 3,528,576 | 9/1970 | Runyan et al. | 214/6 P X |
| 1,472,676 | 10/1923 | Rhoads | 214/6 A |

Primary Examiner—Robert J. Spar
Attorney, Agent, or Firm—Mason, Mason & Albright

[57] ABSTRACT

Bricks or other articles to be dried are loaded onto individual pallets which are fed to a stacking station. The stacked pallets are fed through a drier to an unstacking station, the individual pallets withdrawn from the unstacking station being fed to an article unloading station and then to an article loading station to be loaded with further articles to be dried.

3 Claims, 6 Drawing Figures

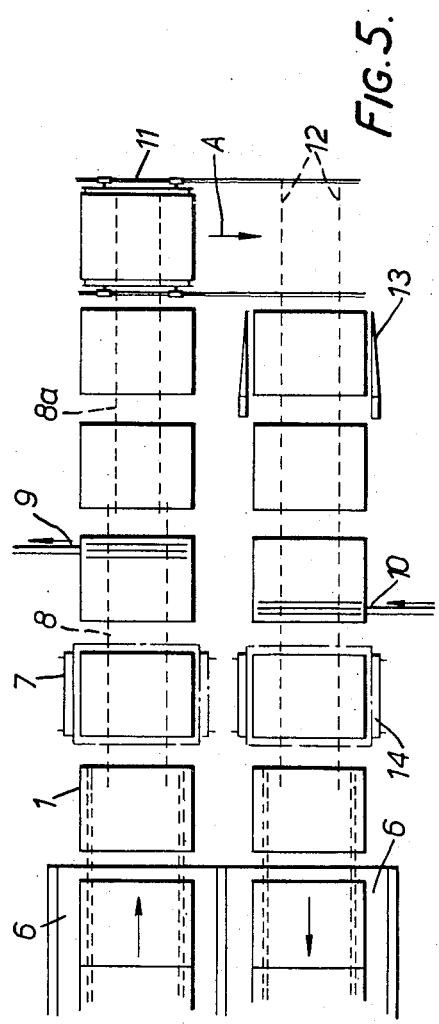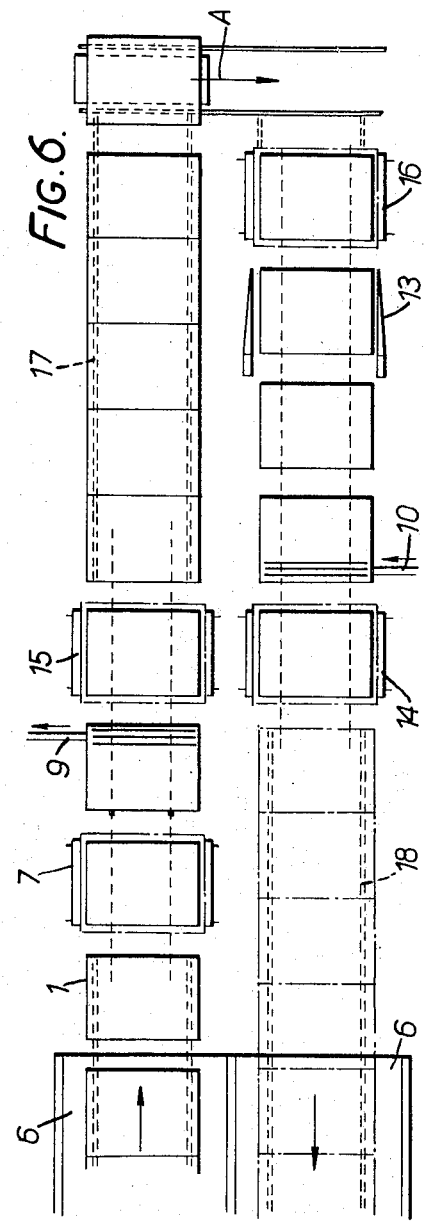

3,792,788

LOADING AND UNLOADING OF BRICKS AND OTHER ARTICLES ONTO, AND FROM, PALLETS

BACKGROUND OF THE INVENTION

1. Field of the Invention

The present invention relates to the loading of bricks or other articles for passage through a drier and for unloading the articles after passage through the drier.

2. Description of the Prior Art

For feeding ceramic ware through a tunnel drier it has been proposed to use drying trolleys in which pallets on suitable supports are placed loosely in position one above the other, or which incorporate fixed supports (pallets) for the ware.

Drying trolleys with loosely placed pallets require to be of very stable construction, because great precision is needed in inserting the pallets. Moreover, the previously proposed loading arrangements are relatively expensive and complicated. To insert the pallets, the drying trolleys are lowered to enable the individual pallets to be pushed on to the trolleys at the same height, layer by layer; this necessitates a pit which is very costly and in many cases cannot be accommodated in the drying plant. Similar considerations apply to drying trolleys incorporating fixed pallets and there is the further difficulty of loading and unloading the pallets. The articles to be dried must be introduced at the individual pallet levels, which process sometimes has unsatisfactory results. In addition to this, once the pallet spacing has been chosen, it is fixed, which means that the spacing must be governed by the height of the largest of the articles to be dried. With smaller articles, there is excessive empty space between adjacent pallets. Consequently the drying trolley and hence also the drier are not always utilised to the full.

SUMMARY OF THE INVENTION

According to the invention, the individual pallets loaded with articles are continuously stacked one above the other, the first pallet to arrive being briefly raised and then lowered on to the next arrival, these two stacked pallets then being raised and lowered on to the third arrival, so that the pallets are stacked to form a pallet trolley, the pallets of which, after traversing a drier, are unstacked, the pallets in the stack, except for the lowermost pallet, being continuously raised and lowered, between which actions the lowermost pallet is fed forward as the stack is raised, and then unloaded and reloaded with further articles.

According to another feature of the invention, where the unloading and loading points are not running in step with each other, a buffer is created between them by stacking the empty pallets to form pallet trolleys, which are put aside.

When large articles are to be carried, every other pallet is turned over through 180° and lowered on to a pallet that is in the normal position, so that when another pallet in the normal position has been deposited on the turned-over pallet, the space between the pallets is doubled in depth.

In apparatus for carrying out the foregoing method conveyors are installed parallel to each other and can be interconnected by a transverse conveyor, the last of the said chain conveyors being a return conveyor in range of a loading point for loading the pallets with kiln ware and a stacking device for stacking the pallets to form pallet trolleys, while the first chain conveyor is in range of an unstacking device for unstacking the pallet trolleys and an unloading point for removing the ware from the pallets, the intermediate conveyor acting as a buffer.

In addition, between the unloading point and the transverse conveyor, there is another stacker, for stacking the pallets to form pallet trolleys, as well as a buffer chain for storing the pallet trolleys.

Between the transverse conveyor and the loading point, there should be a turning mechanism, by which every other pallet is turned over through 180°.

BRIEF DESCRIPTION OF THE DRAWINGS

The invention will now be described, by way of example only, with reference to the diagrammatic drawings, in which:

FIGS. 5 and 6 are plan views of two different forms of loading and unloading apparatus in accordance with the invention.

DESCRIPTION OF THE PREFERRED EMBODIMENTS

Figure 1:
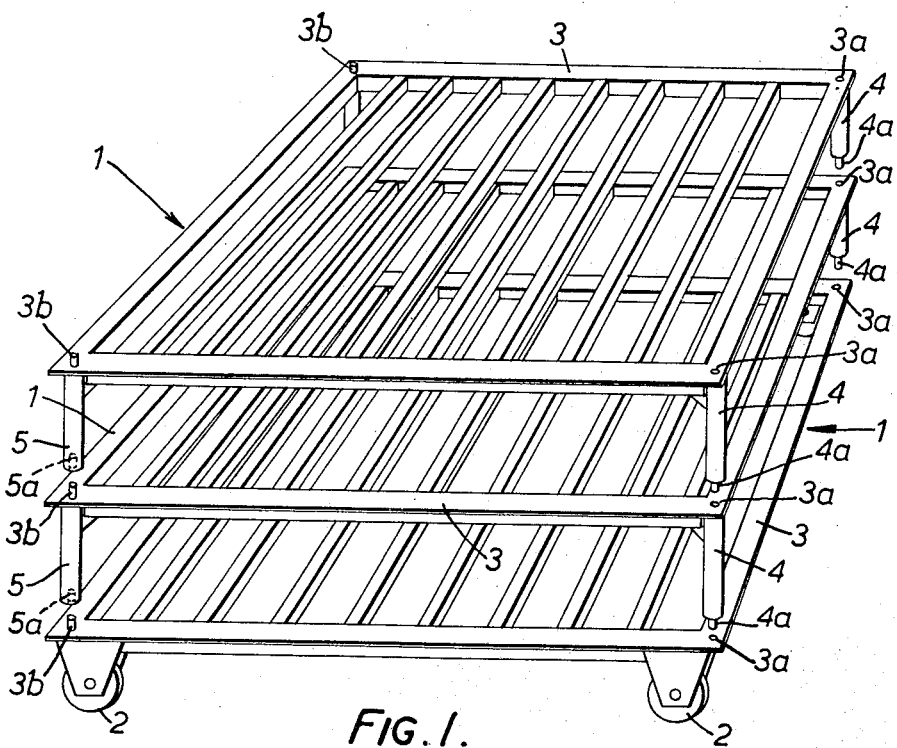
FIG. 1 is a perspective view of a pallet trolley comprising stacked pallets.
Figure 2:
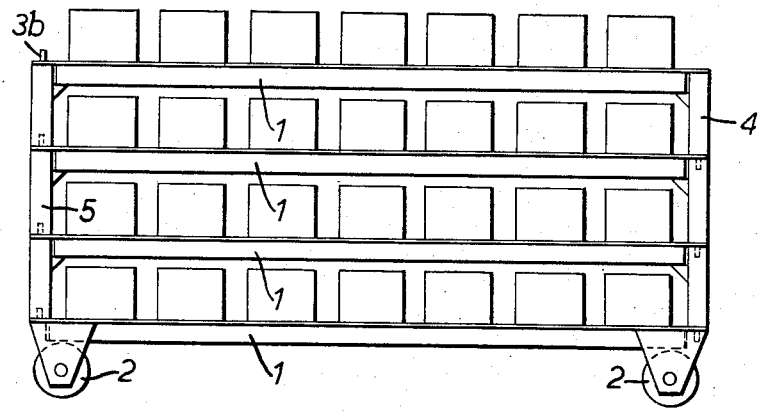
FIG. 2 is a side elevation of the pallet trolley shown in FIG. 1, when loaded.
Figure 3:
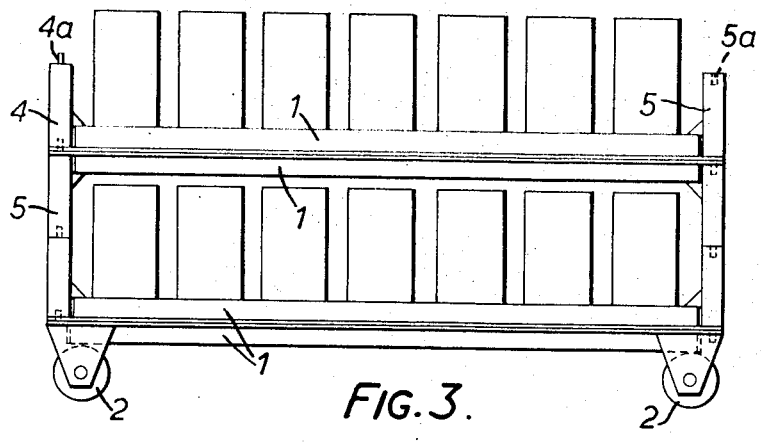
FIG. 3 is a side elevation of a loaded pallet trolley in which the individual pallets are arranged in a different configuration to that shown in FIGS. 1 and 2.

As shown in FIGS. 1 to 3, a pallet trolley comprises several pallets 1, which can be stacked together, the bottom pallet 1 being supported on rollers or wheels 2.

Each pallet 1 comprises a frame 3, and with the exception of the bottom pallet, a downwardly extending leg 4 or 5 at each corner portion of the frame 3. The legs 4 at one pair of adjacent corner portions carry pegs 4a projecting from their lower ends, the pegs 4a being received in apertures 3a in the corresponding corner portions of the adjacent lower pallet. The legs 5 at the other pair of adjacent corner portions contain apertures 5a in their lower end portions which receive pegs 3b upstanding from the corresponding corner portions of the adjacent lower pallet. Thus, it will be seen that the pallets can readily be stacked to form a pallet trolley which can simply be dismantled.

The production programme of a brickworks normally consists in the production of bricks or other articles of different sizes. To enable the kiln or other drier to be utilised to the full, it must be possible to alter the vertical spacing between the individual pallets 1 forming the pallet trolley, and this can be effected as shown in FIGS. 2 and 3.

FIG. 2 shows the configuration of the trolley when articles of normal size are being carried, the configuration of FIG. 2 being identical to that of FIG. 1 whereas comparatively tall articles can be carried when the trolley is arranged as shown in FIG. 3. In the trolley illustrated in FIG. 3, alternate pallets are inverted so that the legs 4 and 5 extend upwards to provide supports for an adjacent pallet 1 in the normal position; in this manner twice as much space is provided between the pallets. Moreover, the fact that the pallets rest on each other in pairs increases the stability of the arrangement since the weight of the load is also necessarily greater in the case of larger articles.

The method and apparatus in accordance with the invention will now be explained in greater detail with the aid of FIGS. 5 and 6.

Pallet trolleys discharged from the drier 6 and loaded with dried articles are carried on rails or the like to an unstacking unit 7, the trolleys being engaged by a chain conveyor 8 so that the wheels 2 of the bottom pallet 1 are disengaged from the rails. The unstacking unit 7 raises all the stacked pallets except the bottom pallet, which is thus freed and can be discharged by the chain conveyor 8. Once the bottom pallet is clear of the unstacking unit 7, the remaining group of stacked pallets is lowered on to the conveyor 8. The unstacking unit 7 then raises the group of stacked pallets with the exception of the lowermost pallet so that this latter pallet remains on the conveyor 8 to be discharged from the unstacking unit 7. These movements are repeated until what was the top pallet of the trolley is left on the chain conveyor 8; in this manner the stack is dismantled. As this top pallet is discharged by the chain conveyors 8, the next pallet trolley enters the unstacking unit 7 and the cycle is repeated.

Unstacking can naturally also be carried out differently. Those skilled in the art will be familiar with mechanisms of suitable type, so that detailed illustration can be dispensed with.

The demounting of the stack of pallets enable loading and unloading to be simplified. The unstacked pallets are fed on the chain conveyor 8 to an unloading unit 9, where the dried articles are removed from the pallets, and then via a transverse conveyor 11 in the direction of arrow A to a loading unit 10, at which the pallets are loaded with further articles to be dried.

Figure 4:
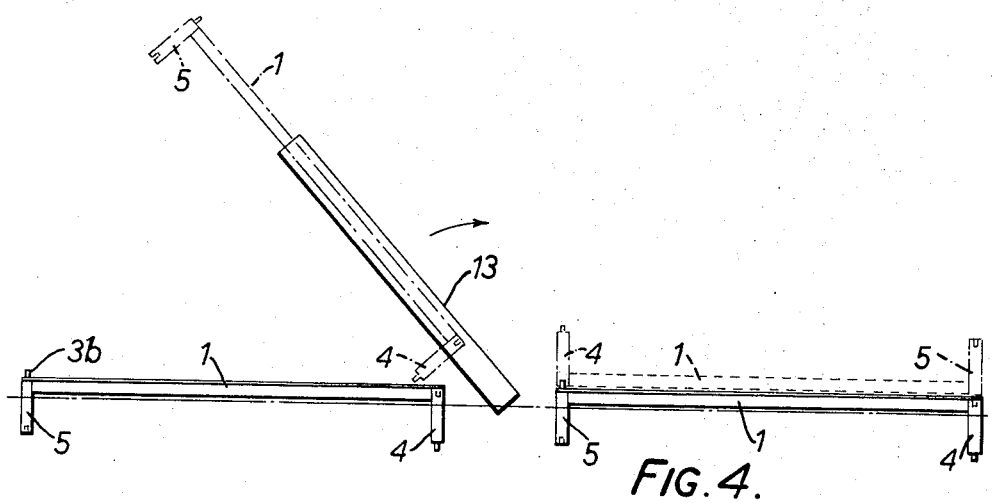
FIG. 4 is a side elevation of a unit for inverting individual pallets.

The unstacked pallets 1 are fed to the transverse conveyor 11 by a chain conveyor 8a, which forms a buffer or equaliser zone. The transverse conveyor 11 comprises a rising transverse chain or a grab which feeds the pallets onto a return chain conveyor 12 on which they are fed to an inverting unit 13 (FIG. 4) which, if the pallets are to be loaded with large-sized articles rotates alternate pallets 1 through 180° about a substantially horizontal axis. The pallets are fed from the inverting unit 13 by the conveyor 12 to the loading unit 10, and thence to a stacking unit 14 at which the loaded pallets are stacked one above the other, and then the complete pallet trolley is run into the drier 6.

In the drier 6, there is a transfer mechanism (not shown) for putting the pallet trolleys on to the return track to be discharged from the drier 6.

The stacking unit 14 operates in an opposite manner to the unstacking unit 7. The first pallet fed to the stacking unit 14 is raised sufficiently to allow a second pallet to be fed precisely under the first. Then the first or upper pallet is lowered on to the second pallet; then the stacking unit 14 engages the second or lower pallet and lifts both pallets to allow a third pallet to be fed under the second pallet, the first and second pallets then being lowered onto the third pallet. This process is repeated with the bottom pallet 1, having the wheels 2, is fed to the stacking unit to complete formation of the pallet trolley.

Normally, the loading and unloading units work in step with each other. Only a small buffer zone is therefore usually required, to offset minor interruptions. If, however, fairly large differences are likely to arise in the operation time of the loading and unloading units, a larger buffer zone should be provided. This may be achieved advantageously, once the pallets have been unloaded, by reforming them into trolleys, which are then unstacked again before being loaded with the further articles to be dried; thus, should operation of the unloading unit be interrupted, the loading unit can be supplied with pallets from pallet trolleys accumulated in the buffer zone, and during interruption in the operation of the loading unit the empty pallet trolleys accumulate in the buffer zone.

This buffer working is shown in FIG. 6. After unloading at the unloading unit 9, the empty pallets 1 are reassembled into pallet trolleys by means of a stacker unit 15, these trolleys then being held on a buffer chain 17, in readiness for feeding to the loading unit. Before being loaded at the loading unit 10, the pallet trolleys are unstacked as required for loading; this is effected by an unstacking unit 16. The pallets, when loaded and assembled to form pallet trolleys, stand ready on a buffer chain 18, at the approach to the drier 6, until the drier is ready to receive them. A similar buffer zone can also be provided at the discharge end of the drier 6.

What is claimed is:

1. A method of loading articles for passage through a drier and of unloading the articles after discharge from the drier, said method comprising the steps of
   loading a group of individual pallets with articles at an article-loading station,
   feeding the loaded pallets of the group sequentially to a pallet-stacking station,
   raising each pallet fed to the stacking station, with the exception of the last pallet of the group, and lowering the pallet onto the following pallet when fed to the stacking station so as to form a stack of loaded pallets with the first pallet of the group lying at the top of the stack and the last pallet of the group lying at the bottom of the stack
   feeding the stack of loaded pallets through the drier to a pallet-unstacking station,
   unstacking the pallets at the unstacking station by repeatedly raising the stack with the exception of the lowermost pallet and withdrawing the lowermost pallet from the unstacking station while the remainder of the stack is raised,
   feeding the pallets withdrawn from the unstacking station to an article-unloading station,
   feeding the unloaded pallets to the article-loading station, and
   rotating, between the article-unloading and loading stations, alternate pallets through 180° about a substantially horizontal axis whereby in the stack of pallets, the spacing between adjacent pairs of pallets is doubled.

2. A method as claimed in claim 1 which the last loaded pallet of the group fed to the pallet-stacking station is supported on wheel means whereby the stacked pallets form a pallet trolley.

3. A method as claimed in claim 2 further comprising the steps of
   feeding the pallets to a buffer zone between the article-unloading and loading stations, and
   stacking the pallets in the buffer zone whereby to accumulate a reserve of pallet trolleys in the buffer zone.

* * * * *